UNITED STATES PATENT OFFICE.

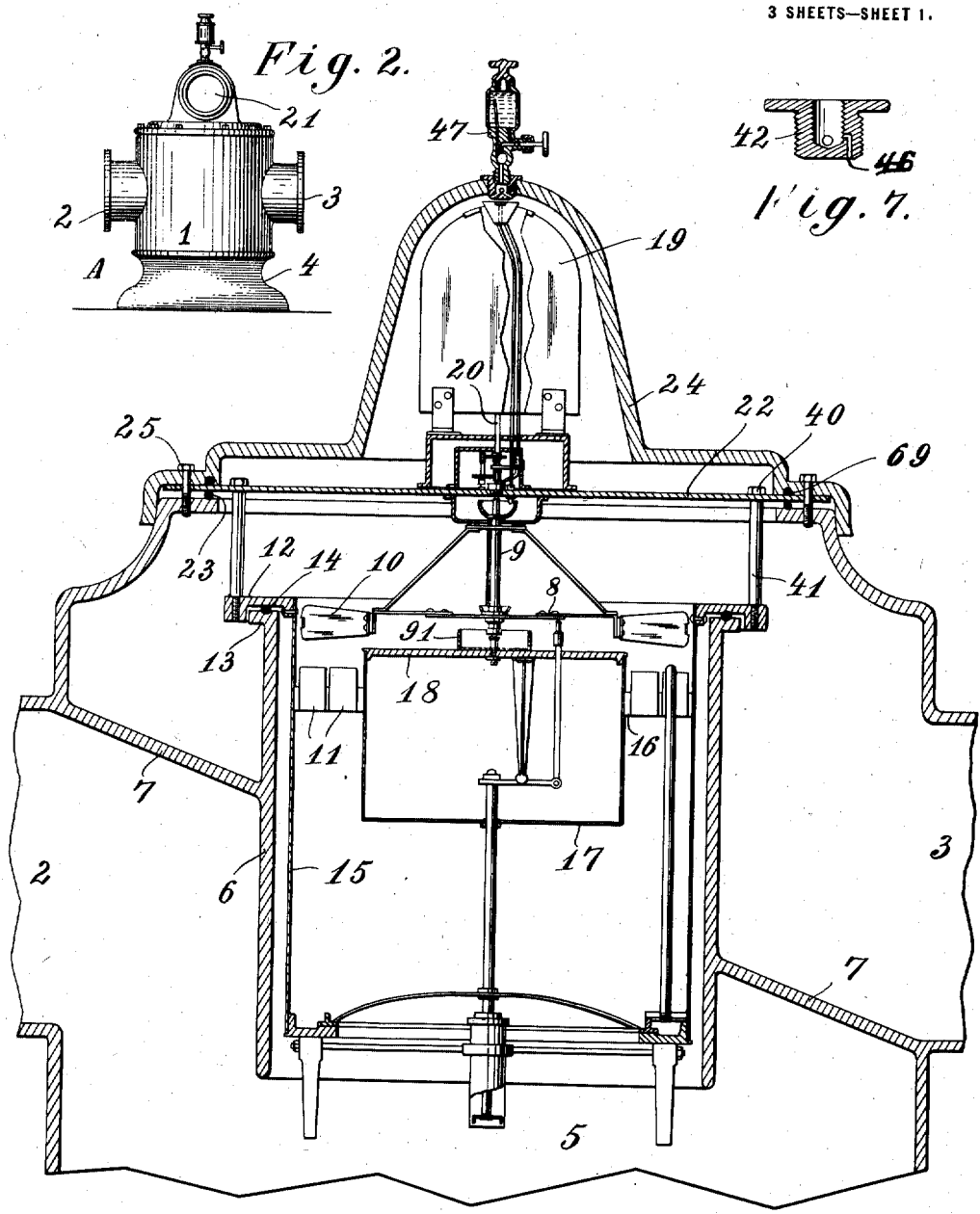

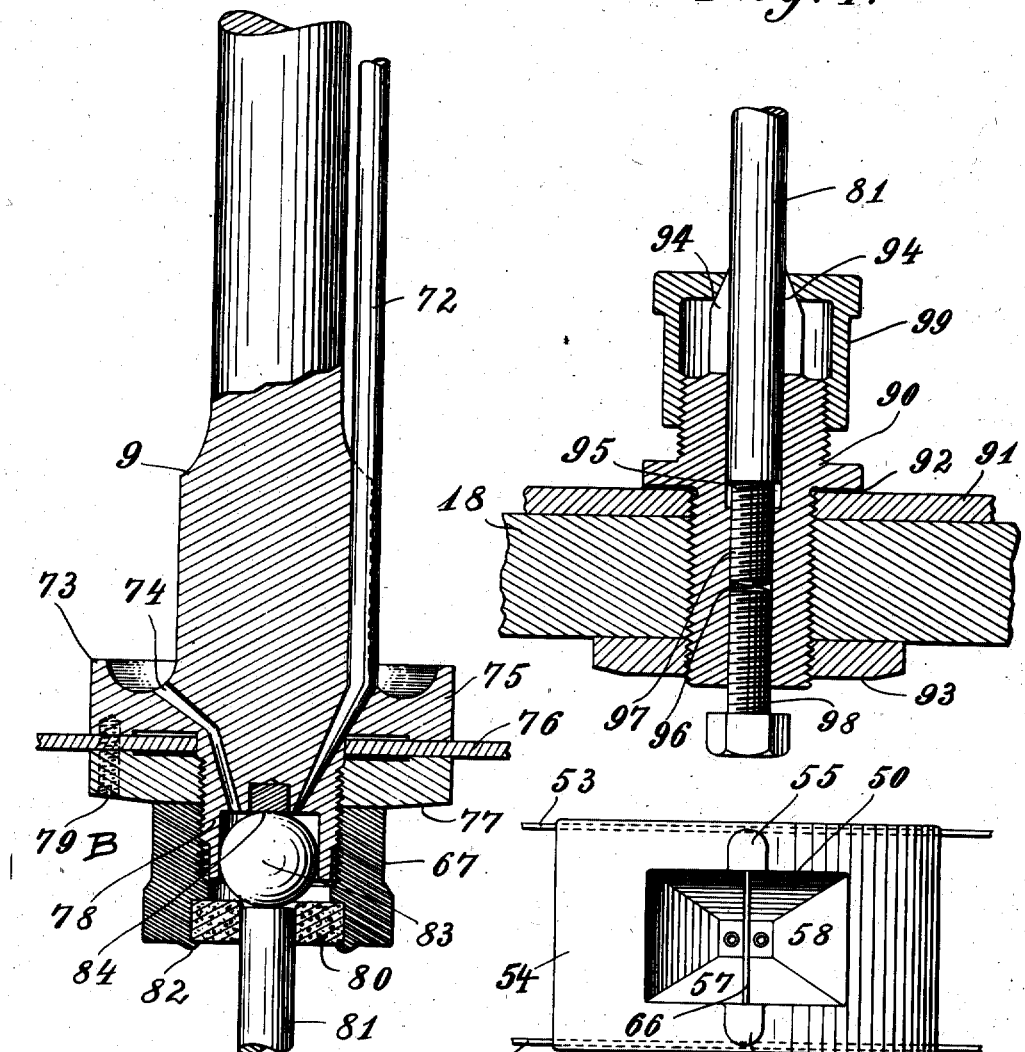

CHARLES P. MAYER, OF ELIZABETH, NEW JERSEY, ASSIGNOR TO ROTARY METER COMPANY, A CORPORATION OF NEW YORK.

LUBRICATION SYSTEM FOR ROTARY METERS.

1,254,054.  Specification of Letters Patent.  Patented Jan. 22, 1918.

Application filed September 10, 1915. Serial No. 49,916.

*To all whom it may concern:*

Be it known that I, CHARLES P. MAYER, a citizen of the United States, and a resident of Elizabeth and State of New Jersey, and whose post-office address is c/o Rotary Meter Co., 280 Broadway, borough of Manhattan, New York, N. Y., have invented certain new and useful Improvements in Lubrication Systems for Rotary Meters, set forth in the following specification.

This invention relates to rotary meters adapted to measure the flow of gaseous fluids through the means of a vane rotated by the flowing fluid. The object of the invention is to render the rotating parts permanently rotatable under constant minimum friction. To this end, there are embodied in the invention novel bearings and novel lubricating means.

The above will be better understood by reference to the accompanying specification, which describes an illustrative embodiment of the invention in connection with the showing thereof, in the accompanying drawings which form a part hereof, in which like characters designate corresponding parts in the several figures, and in which—

Figure 1 is a vertical section with parts broken away showing the interior mechanism in combination with various means entering into the invention;

Fig. 2 is a vertical elevation showing the exterior construction of a rotary meter of the type contemplated;

Fig. 3 is an enlarged detail view for the most part in vertical section and partly in vertical elevation showing the main bearing.

Fig. 4 is a view similar to Fig. 3, but showing the adjustable main bearing stud;

Fig. 5 is a plan view drawn to an enlarged scale of the interior oil reservoir;

Fig. 7 is a detail view in vertical section at right angles to the section of Fig. 1, of the entrance nipple for the oil.

Figure 6:
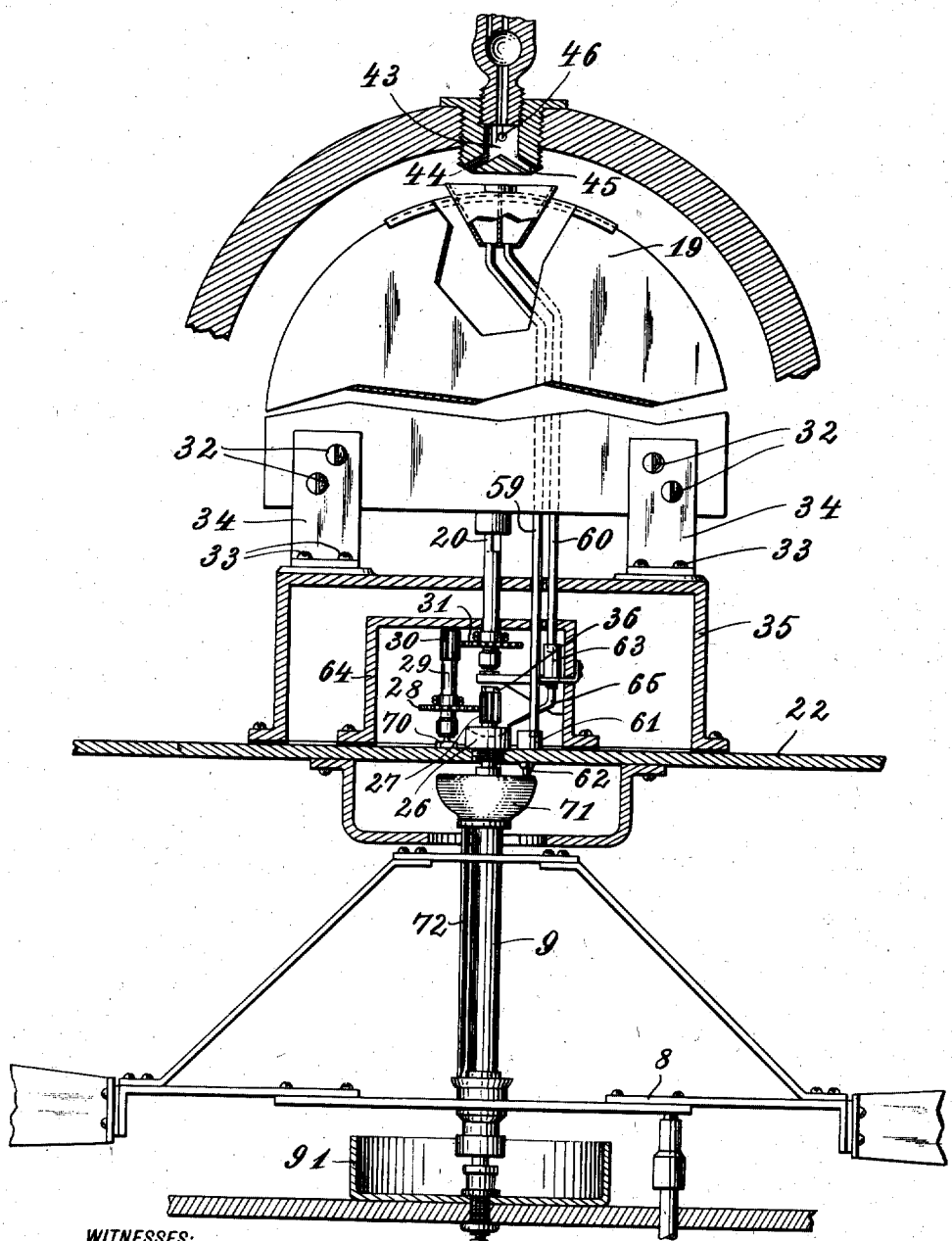
Fig. 6 is a detail view drawn to an enlarged scale showing the oiling system and various parts in vertical section and vertical elevation.

A indicates a rotary meter of the type contemplated which comprises a main casting 1 with its entrance duct 2 and its exit duct 3 and supported by a suitable base 4 forming a closure for the interior 5 of the casting 1. Within the meter casting a vertically arranged cylindrical wall 6 is supported by a diagonal cross partition 7 so that gaseous fluid entering the duct 2 is forced to pass through the interior of the cylindrical shell 6 before it can make an exit through the exit duct 3. The propulsion means for the meter is a vane-wheel 8 carried on the vertical axle 9 and provided with vanes 10 arranged vertically over a ring of ports 11, which ports 11 provide the only means of passage for gaseous fluid from the duct 2 to the duct 3, the interior of the cylindrical shell 6 being closed by the flanged ring 12, seated upon the flange 13 of shell 6 and sealed by the gasket 14. The ring 12 sustains the port shell 15 to which is adapted a port ring 16, while the interior cylindrical box 17 is secured to and supported by the port ring 16. 18 is a supporting casting of the spindle 9.

The purpose of the vaned wheel 8 is to drive a registering mechanism 19, the operating shaft for which is indicated by 20. The dial wheels for the mechanism 19 are visible through the window 21 in the finished structure, although the dials are not shown as the same form no part of the present invention.

Spaced a suitable distance above the vanes 10 is a top plate 22 sealed to the main casting by the gasket 23 and clamped in place by the top housing 24 through the medium of the cap screws 25. The vane spindle 9 is extended upwardly through the plate 22 in which it is journaled in the bearing 26 and is fitted at its top with a pinion 27 meshing with the gear 28 carried by spindle 29 which in turn carries pinion 30 meshing with gear 31 on the drive shaft 20 of the registering mechanism. This drive shaft 20 is releasably clutched to the registering mechanism 19 as through the medium of a squared end so that the registering mechanism 19 may be bodily removed by unfastening mounting screws 32 or 33, serving to mount the legs 34 respectively upon the registering mechanism 19 and the box casting 35.

By removing the screw 36, the pinion 27 may be removed from the upper end of the spindle 9 to permit the removal of the top plate 22 from the vane wheel proper provided merely that the cap screws 40 are unscrewed from the studs 41. In like manner then the vane wheel 8 may be removed bodily from its mounting. This provision for the removal individually of the various sets of mechanical means in the meter is important to facilitate adjustment and repair. To provide lubricating means which will adapt itself to this removal of individual sets of parts and at the same time effect the lubrication of all the parts when they are completely assembled is one of the decided advantages of the invention.

The top hood casting is centrally bored and tapped at the top to receive a nipple 42 which has a central oil chamber 43, straddling exit ducts 44 and 45 and a pressure equalizing duct 46. This nipple 42 is exteriorly threaded and interiorly threaded to take an oil cup 47 of any suitable construction such as that illustrated. Beneath the mouths of the straddling drip ducts 44 and 45 is arranged an oil reservoir 50 shown in detail in Fig. 5 and may be suitably supported upon the front and back plates 52 and 53 of the registering mechanism 19 through the medium of a curved bridging plate 54 centrally perforated to receive the reservoir which is actually held up by its ears 55 and 56. The reservoir 50 is divided by the partition 66 into two compartments 57 and 58. Oil ducts 59 and 60 respectively lead downwardly from the compartments 57 and 58. The duct 59 terminates just inside of an oil pocket 61 supported on the plate 22 which has an exit nipple 62 extending through the bottom of the plate 22. The duct 60 terminates just inside of an oil pocket 63 mounted by a suitable bracket on the yoke-casting 64. This oil duct 63 has an inturned exit nipple 65 discharging into the cup-shaped top of the journal 26. By terminating the ducts 59 and 60 in oil pockets the entire registering mechanism together with the ducts 59 and 60 may be made to be removed and replaced without interfering with the remainder of the oiling system. The casting 35 has a vertical continuous wall and has a gasket at its bottom where it is secured to the plate 22 so that any overflow of oil from the journal 26 will first fill up the bottom of the compartment within casting 35 to lubricate the bearing 70 and will then overflow into the oil pocket 61 and thence downward through nipple 62. Formed on the upper end of the spindle 9 but beneath the plate 22 is an annular oil cup 71 catching the drip from nipple 62. Extending downwardly from the interior of cup 71 is a duct 72 which in turn discharges directly into the interior of the main bearing B for the spindle 9. In addition the lower end of the spindle 9 is formed with an oil catching flange 73 likewise connected by an oil duct 74 with the interior of the bearing B. Through the medium of the nipple 62 and cup 71 it is clear that the plate 22 may be removed and replaced without interfering with the oiling system.

The main spindle bearing B comprises an abutment flange 75 against which the ring 76 of the vane wheel 8 is clamped by the threaded nut 77, which threads upon the counter bored threaded end 78 of the spindle 9. A positive locking of these parts may be accomplished by the screw 79. The lower end of the nipple 67 is open and counter bored to form a setting for the journaling jewel 80 which forms a journal for the supporting stud 81 and may be held in place by lips 82. The weight of the spindle and the parts sustained thereby is supported by the stud 81, but between it and the spindle 9 are interposed a steel ball 83 and an antifriction anvil 84, the ball 83 and contacting parts being well lubricated by the ducts 72 and 74.

The stud 81 is mounted so that a nicety of vertical adjustment, together with positive lateral stability may be secured. A nipple 90 is threaded into the casting plate 18 and also serves the purpose to position the oil drip reservoir 91, which is oil tight through the gasket 92. A lock nut 93 locks the nipple 90 in place. The top end of the nipple 90 is formed into a plurality, preferably four, of conical ring-fingers 94 formed by cross cutting the top end of the nipple 90. The upper portion of this nipple 90 is bored to provide a vertical socket 95 fitting the stud 81. The lower portion is provided with an opening 96 which is threaded to take the threaded lower end 97 of the stud 81 and the locking screw 98. A jam cap 99 is threaded over the top end of the nipple 90. When the jam cap 99 is loose and the locking screw 98 is loose a vertical adjustment of the stud 81 may be accomplished readily by rotating the stud 81. When its proper vertical adjustment is accomplished it may be locked in place by tightening the screw 98. Tightening the cap 99 jams the conical ring fingers 94 in against the stud 81 positively supporting it against any lateral movement.

What is claimed and what is desired to be secured by United States Letters Patent is:—

1. In a rotary meter a plurality of vertically separated spindles, each having a pivot bearing; a frame of superposed sections for mounting said spindles; and an oil duct leading downward through said sections to the lowest bearing and having a cup shaped detachable union at the parting between two adjacent sections.

2. In a rotary meter, a shaft connected to be driven by passing fluid; a supporting frame of spaced sectional parts; spaced supporting bearings for said shaft carried by spaced sectional parts of said supporting frame; and an oil duct extending to one of said bearings from beyond said frame sections, said oil duct including a separable union to facilitate ready separation of the frame sections.

3. In a rotary meter, a vane wheel adapted to be driven by passing fluid; a substantially vertical shaft carrying said wheel and rotatable therewith; a supporting frame of spaced sectional parts; bearings for said shaft at the upper and lower ends thereof carried by upper and lower sections respectively of said sectional supporting frame; an annular receiver carried by said shaft and having communication with said bearing and an oil duct for feeding oil to one of said bearings from above the upper frame section, said oil duct extending through said upper frame section at one side of said shaft and communicating with said annular receiver.

4. In a rotary meter, a vane wheel adapted to be driven by passing fluid; a substantially vertical shaft carrying said wheel and rotatable therewith; a supporting frame of spaced sectional parts; bearings for said shaft at the upper and lower ends thereof carried by upper and lower sections respectively of said supporting frame; means to receive a lubricant for the upper bearing; and a duct arranged to receive over-flow from said last means and communicating with the lower bearing to lubricate said lower bearing.

5. In a rotary meter, a vane wheel adapted to be driven by passing fluid; a substantially vertical shaft carrying said wheel and rotatable therewith; a supporting frame of spaced sectional parts; bearings for said shaft at the upper and lower ends thereof carried by upper and lower sections respectively of said sectional supporting frame; means to receive a lubricant for the upper bearing; a duct arranged to receive over-flow from said last means and communicating with the lower bearing to lubricate said lower bearing, said duct including a separable union for the purpose described.

6. In a rotary meter, a vane wheel adapted to be driven by passing fluid; a substantially vertical shaft carrying said wheel and rotatable therewith; a supporting frame of spaced sectional parts; bearings for said shaft at the upper and lower ends thereof carried by upper and lower sections respectively of said supporting frame; a second shaft connected to be driven by the first shaft; a bearing for the second shaft; means to receive a lubricant for lubricating one of the bearings of the first shaft and adapted to over-flow to lubricate the bearing of the second shaft.

7. In a rotary meter, a vane wheel adapted to be driven by passing fluid; a substantially vertical shaft carrying said wheel and rotatable therewith; a supporting frame of spaced sectional parts; bearings for said shaft at the upper and lower ends thereof carried by upper and lower sections respectively of said supporting frame; means to receive a lubricant for lubricating one of the bearings of said shaft; separate means to receive a lubricant for the second bearing; independent means for supplying lubricant to said two receiving means; and one of said receiving means being disposed to receive an over-flow from the other receiving means.

8. In a rotary meter, a vane wheel adapted to be driven by passing fluid; a substantially vertical shaft carrying said wheel and rotatable therewith; a supporting frame of spaced sectional parts; bearings for said shaft at the upper and lower ends thereof carried by upper and lower sections respectively of said supporting frame; means to receive a lubricant for lubricating one of the bearings of said shaft; separate means to receive a lubricant for the second bearing; independent means for supplying lubricant to said two receiving means; and each of said supply means including a separable union for the purpose described.

9. In a rotary meter, register operating mechanism comprising a plurality of moving parts requiring lubrication; a lubricant container; separable frame sections supporting said mechanism and said container, a plurality of ducts extending from said container to the parts to be lubricated, said ducts comprising parts arranged with respect to the container to receive lubricant therefrom but being separately formed and mounted independently of the container to permit ready removal of the frame section carrying the container.

10. A rotary meter, comprising a casing having a removable cover member; mechanism within the casing requiring lubrication; an oil cup carried by and removable with the cover member and having a discharge opening in its lower end; a member having a pair of openings arranged symmetrically beneath said discharge opening and adapted to receive substantially equal parts of oil from said discharge opening; and a pair of oil ducts extending through portions of said mechanism to be lubricated, the upper ends of said oil ducts terminating in disconnected relation beneath said pair of openings to receive oil dropped therefrom respectively.

11. A rotary meter, comprising a casing having a removable cover member; an oil cup carried by and movable with the cover member; mechanism within the casing requiring lubrication; and an oil duct also within the casing leading from the oil cup to parts requiring lubrication, said oil duct being separately formed and having releasable connections.

12. A rotary meter, comprising a casing having a removable cover member; an oil cup carried by and removable with the cover member; a register within the casing; operating mechanism therefor also within the casing; an oil duct leading from the oil cup to parts of said operating mechanism requiring lubrication, said oil duct including an oil receiving reservoir; and a member carried by the register and having an opening therein to loosely receive the reservoir and to removably retain it in a position to receive oil dropped from said oil cup.

13. In a rotary meter, registering mechanism therein requiring lubrication; an oil duct for conducting lubricant to parts of said mechanism; a plate supported horizontally by said mechanism and having an opening therethrough; said duct including an oil receiving reservoir received in said opening, ears formed upon said reservoir over-hanging portions of said plate adjacent said opening to removably support the reservoir within said opening; and an oil cup supported about the reservoir to drop oil therein.

In witness whereof, I have signed my name to this specification, in the presence of two subscribing witnesses.

CHARLES P. MAYER.

Witnesses:
J. H. HENDRICK,
LEONARD DAY.